(12) United States Patent
Atwood et al.

(10) Patent No.: US 10,574,460 B2
(45) Date of Patent: Feb. 25, 2020

(54) MECHANISM FOR ACHIEVING MUTUAL IDENTITY VERIFICATION VIA ONE-WAY APPLICATION-DEVICE CHANNELS

(71) Applicant: Google LLC, Mountain View, CA (US)

(72) Inventors: Scott Atwood, Campbell, CA (US); Artem Malyshev, Kilchberg (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/347,650

(22) PCT Filed: Dec. 13, 2017

(86) PCT No.: PCT/US2017/066073
§ 371 (c)(1),
(2) Date: May 6, 2019

(87) PCT Pub. No.: WO2019/117889
PCT Pub. Date: Jun. 20, 2019

(65) Prior Publication Data
US 2019/0363886 A1    Nov. 28, 2019

(51) Int. Cl.
*H04L 29/06* (2006.01)
*H04L 9/32* (2006.01)
(Continued)

(52) U.S. Cl.
CPC .......... *H04L 9/3213* (2013.01); *H04L 9/3273* (2013.01); *H04L 63/18* (2013.01);
(Continued)

(58) Field of Classification Search
CPC ..... H04L 9/3213; H04L 9/3273; H04L 67/42; H04L 63/18
(Continued)

(56) References Cited

U.S. PATENT DOCUMENTS

| 2016/0267280 A1* | 9/2016 | Mansour ............... G06F 21/602 |
| 2018/0098364 A1* | 4/2018 | Meads .................... H04L 67/02 |
| 2018/0375865 A1* | 12/2018 | Seibert, Jr. .......... H04L 63/0807 |

FOREIGN PATENT DOCUMENTS

| WO | 2014191745 A1 | 12/2014 |
| WO | 2017194852 A1 | 11/2017 |

OTHER PUBLICATIONS

International Search Report and Written Opinion for Application No. PCT/US2017/066073, dated Sep. 7, 2018. 15 pages.

* cited by examiner

*Primary Examiner* — Evans Desrosiers
(74) *Attorney, Agent, or Firm* — Lerner, David, Littenberg, Krumholz & Mentlik, LLP (57) ABSTRACT

To authenticate a service request, a first server receives a handshake request from a client application. The first server transmits a first nonce to the client application. The first server sends a second nonce and the handshake request to a second server. The second nonce may be a key for decrypting the first nonce, or it may be a separate nonce. The first server stores a result of an operation performed on the first and second nonces. The client application receives a push notification with the second nonce from the second server via a secure and authenticated communication channel. The client application also performs an operation on the nonces to generate a candidate result, which it sends to the first server. If the candidate result matches the stored result, the first server will send the client application a token that grants access to a service.

20 Claims, 5 Drawing Sheets

(51) Int. Cl.
    *H04W 12/00* (2009.01)
    *H04W 12/06* (2009.01)
(52) U.S. Cl.
    CPC ....... *H04L 67/42* (2013.01); *H04W 12/00512* (2019.01); *H04W 12/06* (2013.01)
(58) Field of Classification Search
    USPC .......................................................... 726/9
    See application file for complete search history.

MECHANISM FOR ACHIEVING MUTUAL IDENTITY VERIFICATION VIA ONE-WAY APPLICATION-DEVICE CHANNELS

CROSS-REFERENCE TO RELATED APPLICATION

This application is a national phase entry under 35 U.S.C. § 371 of International Application No. PCT/US2017/066073, filed Dec. 13, 2017, the entire disclosure of which is incorporated herein by reference.

BACKGROUND

Electronic devices such as computers, smartphones, smart watches, voice-activated home assistants, and Internet-of-things connected devices typically run a variety of applications. Some of these applications may be native to or otherwise known and trusted by the operating system running on the device. Others may be third-party applications supplied by others, which may not be known when first installed on the device.

Applications running on a device want to communicate with a server, and the server wants assurances that it is the application talking with the server, and not someone pretending to be the application. When an application running on a client device makes a service request to a server, the server will be programmed to ensure that the request is authentic before it grants the request. Thus, the client application must provide some form of identity verification to the server. One way of doing this is by bundling a token with the application, then having the application send that token to the server However, one may not wish to bundle a key, certificate or other token with the application itself. A pretender can take apart the application, extract the token, and masquerade as the application. Thus, bundling the key with the application could expose the token to being extracted and used by attackers to spoof requests.

In addition, third-party applications that are not native to or known by the operating system of the client may face difficulty obtaining authentication. The client's native service may not permit the application to obtain a service without authorization. In addition, the one-way application-device secure authenticated channel described above is not a two-way channel.

This document describes methods and systems that are directed to solving at least some of the issues discussed above, and/or other problems.

SUMMARY

In some aspects, in a method of authenticating a service request, a first server receives a handshake request from a client application on a client electronic device via a communication network. The handshake request includes an application identifier for the client application and a device identifier for the client electronic device. The handshake request also may identify the client application as having been authenticated to the second server and as being entitled to receive a notification using the secure and authenticated communication channel. The first server generates a first nonce and transmits the first nonce to the client electronic device. The first server stores, in a memory, the result of a logical or mathematical operation performed on the first nonce and on a second nonce. The first server may transmit the application identifier and the device identifier to a second server in a request to forward a notification to the client application via a secure and authenticated communication channel. The first server receives, from the client application, a message that includes a candidate result. The first server determines whether the candidate result matches the stored result. In response to determining that the candidate result matches the stored result, the first server transmits a token to the client electronic device. Subsequently, the first server will receive a service request from the client application. The first server will inspect the service request to determine whether the service request includes the token and that the token is valid. Upon determining that the service request includes the token and that the token is valid, the first server will provide the client application with a service that is responsive to the service request.

When inspecting the service request to determine whether the token is valid, the first server may require, as a condition of determining that the token is valid, that the token is associated with an expiration time that has not yet passed.

The first server may generate or receive the second nonce. If the first server generates the second nonce, it may perform the logical or mathematical operation on the first nonce and the second nonce, and it may include the second nonce in the request that it sends to the second server.

The second server may provide a push functionality capable of forwarding, via the secure and authenticated communication channel and in response to a push request, the notification to the client application through the secure and authenticated communication channel. The step of transmitting the second nonce to the second server may include forwarding at least a portion of the handshake request to the second server with a push request that is configured to cause the second server to forward the second nonce to the application in a message through the secure and authenticated communication channel via the push functionality.

Before sending the first nonce to the client electronic device, the first server may encrypt the first nonce so that the first nonce, when sent to the client electronic device, is sent in encrypted form. The first server may then transmit a key for the encrypted first nonce to the second server. Optionally, this key may be used as a second nonce.

Before sending the first nonce to the client electronic device, the first server may encrypt the first nonce so that the first nonce, when sent to the client electronic device, is sent in encrypted form. If so, the first server may transmit a key for the encrypted first nonce, the application identifier and the device identifier to a second server, either directly or indirectly via a third server. The first server also may transmit the first nonce to the third server. Before storing the result of the operation, the first server may receive the second nonce from the third server and perform the logical or mathematical operation on the first and second nonces to yield the result of the operation. Alternatively, the third server may perform the operation on the nonces, and before storing the result of the operation the first server may receive the result of the operation from the third server.

A second secure and authenticated communication channel may exist between the application of the client electronic device and the second server. The second server may provide a push functionality capable of forwarding, via the second secure and authenticated communication channel and in response to a push request, a message to the client application through the second secure and authenticated communication channel. The handshake request also may include a token that identifies the client application as having been authenticated to the second server and as being entitled to receive a message through a push notification using the secure and authenticated communication channel. The step of transmitting the first nonce to the second server may include forwarding at least a portion of the handshake request with a push request that is configured to cause the second server to forward the second nonce and the key to the application in a message through the second secure and authenticated communication channel via the push functionality.

Optionally, the first server may receive an additional service request from the client application via the first secure and authenticated communication channel, wherein the additional service request includes the token. The first server may inspect the additional service request. Upon determining that the additional service request includes the token and that the token is valid, the first server may provide the client electronic device with an additional service that is responsive to the additional service request.

Optionally, the first server may maintain a record of a plurality of applications, each of which may be authenticated by receipt of the token. The first server may receive an additional service request for a different application from the client electronic device, wherein the additional service request includes the token, a different application identifier, and the device identifier. The first server may inspect the additional service request. Upon determining that (a) the additional service request includes the token, (b) the additional service request is for an application that is in the record and (c) the token is valid, the first server may provide the different application of the client electronic device with an additional service that is responsive to the additional service request. Optionally, determining that the token is valid may include confirming that the device identifier received with the additional service request is the same device identifier that was received with the handshake request.

Optionally, the candidate result generated by the client application may be based on the client application causing the client electronic device to perform the logical or mathematical operation on the first and second nonces. The client application may receive the second nonce from the second server through the second secure and authenticated communication channel, and the client application may receive the first nonce from the first server through either a secured or an unsecured communication channel.

Optionally, before receiving the candidate result, the first server may provide the client application with provisional access to the service.

In other aspects, in a method of requesting a service a client application on a client electronic device generates a handshake request for a first server. The handshake request includes an application identifier for a first application running on the client electronic device and a device identifier for the client electronic device. The handshake request also identifies the first application as having been authenticated to a second server and as being entitled to receive a notification from the second server using a first secure and authenticated communication channel. The client application will cause the client electronic device to transmit the handshake request with the application identifier and the device identifier to the first server. The client application will receive a first nonce from the first server. The client application will receive, from the second server via the first secure and authenticated communication channel, a push notification that includes a second nonce. The client application will perform a mathematical or logical operation, such as an exclusive OR operation, on the first nonce and the second nonce to yield a candidate result. The client application will cause the client electronic device to transmit the candidate result to the first server. The client application will receive a response from the first server, wherein the response includes a token.

The client application may also cause the client electronic device to transmit a service request for a service to the first server and present the first server with the token in connection with the service request. The client application may receive the service from the first server via a second secure and authenticated communication channel in response to the service request.

If the first nonce is an encrypted nonce and the push notification includes a key, then before causing the client electronic device to perform the logical operation the client application may cause the client electronic device to use the key to decrypt the first nonce.

The client application may share the token with a second application running on the client electronic device, cause the client electronic device to transmit a service request with the token and an application identifier for the second application to the first server via the secure and authenticated communication channel between the client and the first server, and receive the service from the first server in response to the service request.

In some aspects, the push notification may be a silent push notification.

In some aspects, the handshake request may include a token that identifies the client application as having been authenticated to the second server and as being entitled to receive a message through the push notification.

In some aspects, the first server may generate the first nonce and transmit the first nonce to the client application. The first server may transmit the second nonce to the second server by forwarding a push request from the first server to the second server, either directly or indirectly via a third server. The push request may include the token, the application identifier, and the second nonce.

Before receiving the push notification, the client application may cause the client electronic device to receive provisional access to the service from the first server.

DETAILED DESCRIPTION

Terminology that is relevant to this disclosure includes:

In this document, the singular forms "a," "an," and "the" include plural references unless the context clearly dictates otherwise. The term "comprising" means "including, but not limited to." Similarly, the term "comprises" means "includes, and is not limited to." Unless defined otherwise, all technical and scientific terms used in this document have the same meanings as commonly understood by one of ordinary skill in the art.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion below, a client electronic device, server, virtual machine or container may be referred to simply as a "device" for brevity. Additional elements that may be included in electronic devices will be discussed below in the context of FIG. 5.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

Figure 1:
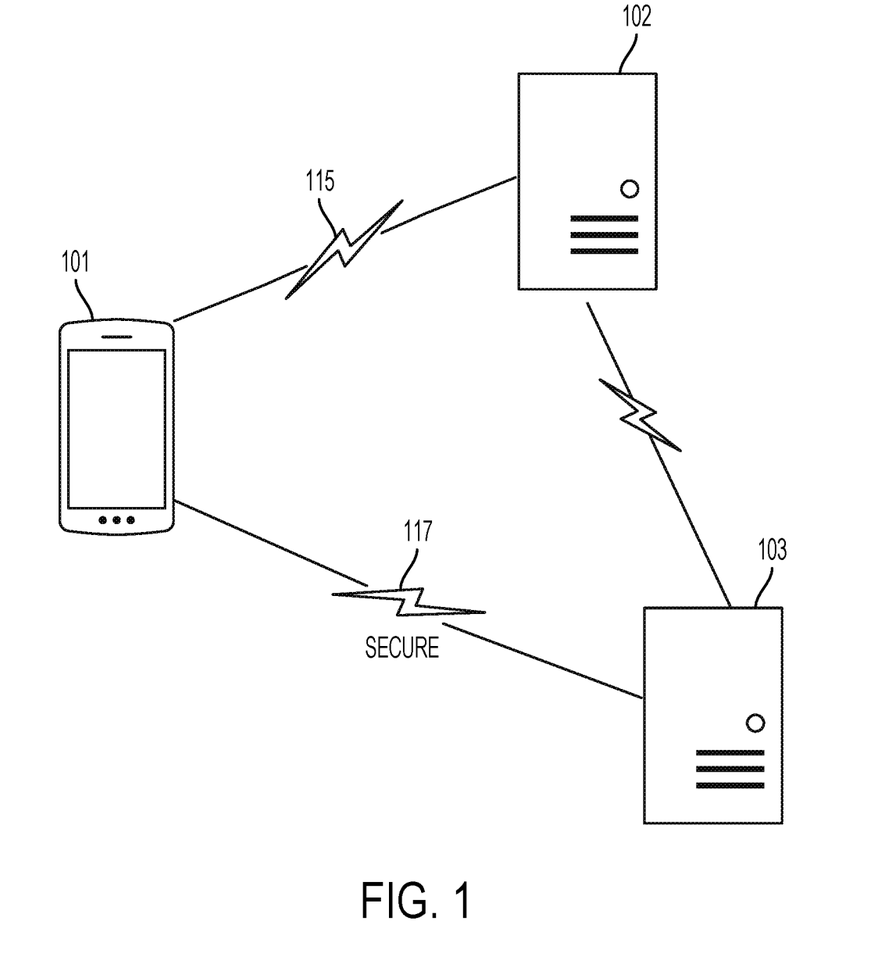
FIG. 1 illustrates example elements of a system by which a set of servers may authenticate a service request from a client electronic device.

FIG. 1 illustrates an example of a system that includes an electronic device 101 on which one or more client applications are installed. The client applications may include messaging service applications, streaming media service applications, social media applications, file sharing service applications, and/or other applications. The electronic device 101 may be considered to be a client electronic device because the client applications run on the client device and access certain functionality that is served by a remote application server 102. The remote server 102 (illustrated in other drawings of this application as "Server A") is in communication with the client electronic device 101 via a communication channel 115 that is made up of one or more wired and/or wireless communication networks. The communication channel 115 may be a secure channel or an unsecured channel. A secure channel is a mode of communication that uses encryption or other security measures to enable secure and authenticated communication between systems and/or devices.

Client electronic device 101 is also in communication with a second server 103. Second server 103 (referred to in the discussion below as "Server B") may be an authentication server or a server that is associated with an operating system or other application running on the electronic device 101. The client electronic device 101 will be known to the second server 103 so that when the client electronic device 101 presents certain information to the second server 103 (such as a unique device identifier in a form such as a code or token), the second server 103 may provide the client electronic device 101 with a service and/or authentication credentials for a service. Communication between the client electronic device 101 and the second server 103 will be via a secure and authenticated communication channel 117.

The first server 102 and second server 103 also may communicate with each other via a secured or unsecured communication channel.

Figure 2:
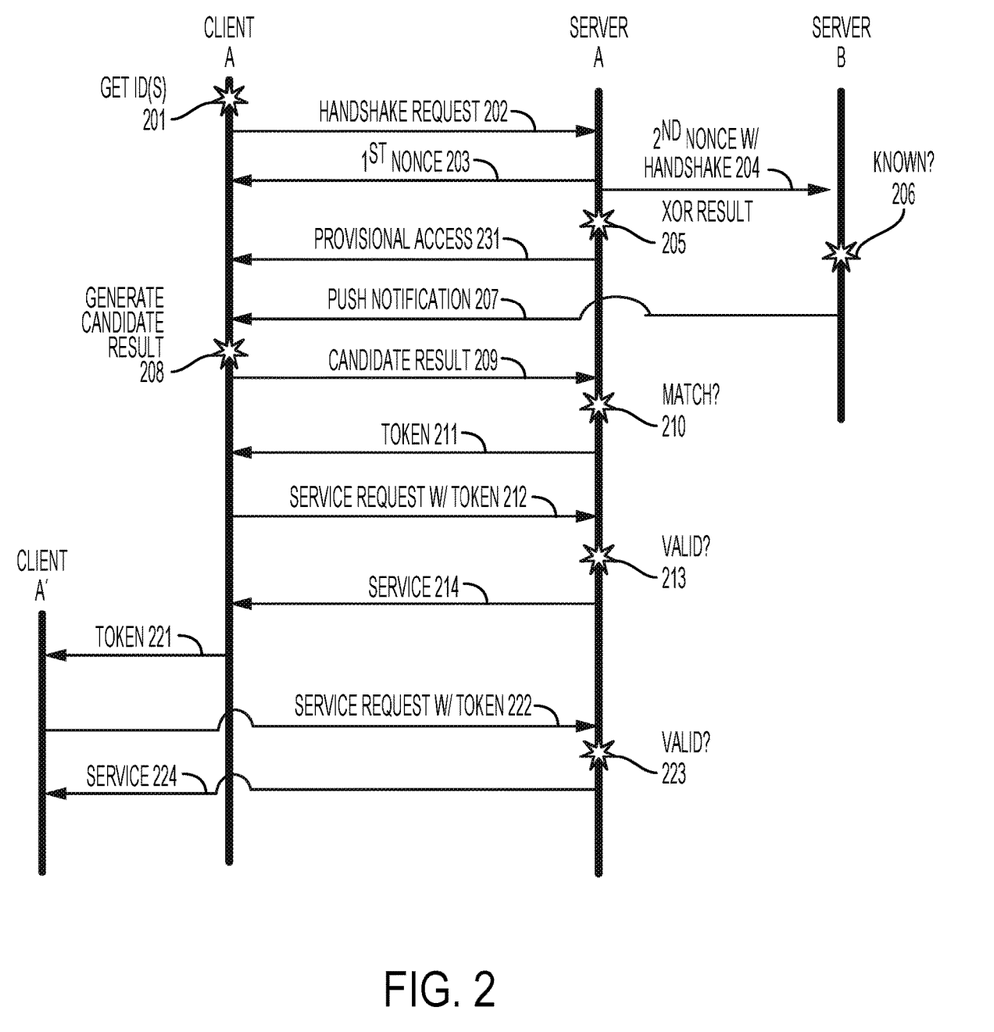
FIG. 2 illustrates a process by which a set of servers may authenticate a service request from a client electronic device.

FIG. 2 illustrates a process by which the system of FIG. 1 may operate. A client application installed on the client electronic device will, in the course of running on the device, obtain the client electronic device's device identifier (step 201) by retrieving it from a memory of the electronic device. The client application will have an associated application identifier. In some embodiments, upon launch the client application may request an access point name's (APN's) device token, which is a globally unique token that identifies the device:application tuple. The system also may use other methods of obtaining the device identifier and application identifier.

The client application will generate a handshake request, and it will cause a transmitter of the client electronic device send the handshake request to a first server (illustrated as "Server A") via a communication channel that may or may not be secure (step 202). The payload of the handshake request will include the application identifier for the client application and a device identifier for the client electronic device, optionally in the form of the device token as described above. The device identifier of the token may be used by a second server (illustrated as "Server B") to indicate that the client electronic device is known by, and authorized to receive certain push notifications (as will be described below) from, the second server. The application identifier of the token may be used by the second server to identify the application on the device to which a push notification or other message will be directed. Alternatively, the payload of the handshake request may include other data that Server B will know indicates that the client electronic device is authorized to receive the push notifications.

Server A will receive the handshake request and generate a first nonce using any suitable random code generation process. Server A will send the first nonce to the client electronic device (step 203) via a communication channel that may or may not be secure. In some embodiments, Server A will store the first nonce in its memory, and it may encrypt the first nonce and randomly generate a symmetric encryption key that the client electronic device may use to decrypt the first nonce. If so, then when transmitting the first nonce to the client electronic device (step 203), Server A will send the first nonce to the client electronic device in encrypted form. However, Server A will not send the encryption key to the client electronic device. The client electronic device will store the encrypted nonce in its memory for use later in the process, which will be described below.

Server A also will generate a second nonce. Optionally, the second nonce may be the encryption key that Server A generated for the first nonce. If so, the encryption key itself may be considered to be the second nonce. Alternatively, the second nonce may be a separate item from the encryption key. Server A will send the second nonce along with at least some information from the handshake request, such as the device identifier (and the encryption key for the first nonce, if separately generated) to Server B (step 204). The communication in step 204 may be considered to be a push request that is configured to cause Server B to send a push notification to the client device. In addition, Server A will perform a logical or mathematical operation on the first and second nonces (step 205), and it will store the result of the operation in a memory. In the example illustrated in FIG. 2, the operation is an exclusive OR (XOR) cipher in [first nonce ⊕ second nonce]=result. However, Server A may alternatively perform other operations such as a hash, a more complex cipher of which an XOR operator is a component, or another function.

When Server B receives the push request from Server A, Server B will inspect the push request to determine whether the client electronic device is a known device (step 206). Server B may do this by confirming that the device identifier or token in the push request matches a known identifier or token. By way of example, Server B may use a security identifier that part of the token to look the token up in a database to verify whether the token is identified in the database as being properly issued and not revoked, and/or a level of authorization for the token. Alternatively or in addition, Server B may verify a cryptographic signature of the token such as by using a public key to decrypt the certificate and verify the that the token was signed by a trusted private key. Other authentication processes also may be used.

If Server B identifies the client device as a known device, Server B will generate a push notification that includes the second nonce and (if available) the key that Server B received from Server A, and Server B will send the push notification to the client electronic device via a secure and authenticated communication channel (step 207). In various embodiments, the push notification may be a silent push notification that is transmitted to, and downloaded by, the client electronic device for use by the client application without the user being required to accept the download. The push notification will include an identifier of the application to which the push notification is being directed.

In various embodiments of the process described above, Server B may be a single server, or it may include multiple servers and/or data stores that are in communication with each other. In multi-server embodiments, one of the servers B1 may receive the push notification request, and a different server B2 may communicate with the client device. Either of these servers, or an intermediate server, may inspect the push request and generate the push notification. Any of these servers that make up "Server B" also may present a "push notifications as a service" interface to Server A.

After the client electronic device receives the push notification, the client application will then have both the first nonce and the second nonce. If the client electronic device received the first nonce in encrypted form, and if it received the key with the push notification, the client application may extract the key from the payload of the push notification and use the key to decrypt the first nonce. Thus, the client application can then perform the same operation on the first and second nonces as Server A performed, such as an XOR operation (step 208). The result of the operation may be referred to in this document as candidate result. Alternatively, in some embodiments the operation may simply be decrypting the first nonce, in which candidate result may simply be the decrypted first nonce. The client application will cause the client electronic device to send the candidate result to Server A (step 209), along with some identifying information such as a token received from Server A or Server B, the application identifier and/or the device identifier, to request a token for the service.

As noted above, in some embodiments Server A may generate a first nonce and encrypt the first nonce, and the key for decrypting the first nonce may be considered to be the "second nonce." The first nonce is encrypted by Server A and sent from the Server A to the client application where it is stored. In this embodiment the key for decrypting the first nonce (the "second nonce") is also sent by Server A to Server B as part of a push request, with the key for decrypting the first nonce forming the payload of the push request. The push request further includes a device identifier (such as a device token) for identifying the client device and the client application as the intended recipient of the message to be pushed by Server B. Server B may then act in response to the push request to forward the key for decrypting the first nonce (which in this embodiment is the second nonce) to the client application, thereby enabling the client application to decrypt the first nonce. In this manner the "secret" decryption key, which was generated by Server A and therefore is only known by Server A (except for "trusted" Server B, which receives it as part of the push request), is received by the client application in a specific way, namely through the push mechanism from the (trusted) Server B towards the client application. If the push mechanism implemented at Server B is designed such that it requires a "pre-authentication" of the client application towards Server B in order to receive a push message by the client application, then the fact the client application is able to receive the secret decryption key which was generated by Server A and was forwarded to the client application through the push mechanism via Server B proves that the client application has undergone such an authentication procedure. By decrypting the first nonce and forwarding the decrypted first nonce towards the Server A the client can then prove towards Server A that it has undergone such an authentication towards Server B, and the Server A may then be configured such that it accepts this proof of authentication towards Server B as an equivalent to an authentication towards Server A. In other words, showing that the client application has received the secret key generated by Server A and pushed to the client application through the push mechanism of Server B in effect is equivalent to an authentication of the client application towards Server A. In this embodiment one may consider that the key generated by Server A to decrypt the first nonce which is then pushed to the client via Server B is a second nonce. One may further consider that the decryption of the first nonce performed by the client application using the decryption key (in this case the second nonce) is a mathematical operation and that the result of this mathematical operation is the candidate result, which the client application then sends to the Server A in order to authenticate itself towards Server A.

In a further alternative embodiment Server A generates a first nonce, which Server A sends to the client application without encrypting it. Server A also generates a second nonce, which is not a decryption key for the first nonce. Both the first and second nonces in this embodiment may just be random numbers. Server A may then perform a logical or mathematical operation on the two nonces. The operation may be an XOR operation. The result of this logical operation may then be stored in Server A. While Server A sends first nonce to the client application, Server A includes the second nonce as a part of a push request sent from Server A to Server B like in the previous embodiment, with the second nonce forming at least part of the payload of the push request. If the client application and the client device, which are identified by this push request, are entitled to receive a push message because they have been pre-authenticated towards Server B, then Server B will send the push message to the client application in response to the push request that Server B received from Server A, with the second nonce forming at least part of the payload. The client application (if it has been pre-authenticated towards Server B) then will receive the push message with the second nonce as a payload, and it will then perform the same operation on the first and second nonces as Server A performed on the nonces, thereby obtaining a candidate result at the client application. If the client application correctly received the second nonce (the secret generated by Server A) via the push message, the candidate result generated at the client application will be the same as the result of the operation generated at Server A. By forwarding the candidate result to Server A, the client may therefore prove knowledge of the secret second nonce, a knowledge which it only can have if it has been pre-authenticated towards Server B. By proving this knowledge the client application may authenticate itself also towards Server A, if Server A is configured such that it considers an authentication towards Server B as being equivalent to an authentication towards Server A. Server A may be configured in this way if Server B is a trusted server.

In the previous embodiments there exists a secure and authenticated communication channel between the application of the client electronic device and Server B. This may be achieved by providing the push mechanism, which provides and requires a secure and authenticated channel between Server B and the client application. If the client application and the device on which it is running have been authenticated towards Server B, then there is enabled the push mechanism for forwarding a push message by Server B to the client application via a secure and authenticated channel. This mechanism thereby is open for external sources (such as Server A), which may request such a push message to be sent to any application and device that have been pre-authenticated towards Server B, and Server B may provide such a push message mechanism on request thereby sending the intended payload via a secure and authenticated channel, if the entity that requests the push message to be sent can submit to Server B the necessary identification data of the intended recipient (the client application and the client device) which identify the intended recipient as authenticated towards Server B. Using this mechanism any external entity and likewise also Server A may request such a push message to be forwarded to the client application. By using a secret, which only Server A knows, as a payload, and by proving knowledge of this secret by the client application, the authenticated and secure channel and the pre-authentication of the client application towards Server B can be leveraged by Server A to implement an authentication of the client application towards Server A, because the secret can only be received by a client application, which has been pre-authenticated towards Server B In the previous embodiments, Server B provides a push functionality capable of forwarding, via the secure and authenticated communication channel and in response to a push request, a message to the client application through a secure and authenticated communication channel. This is leveraged for authenticating a client application towards Server A.

It should be noted that in the previous embodiments the handshake request may identify the client application as having been authenticated to the second server (Server B) and as being entitled to receive a message through a push notification using the secure and authenticated communication channel. This may be done as described before, e.g. by including a device identifier and an application identifier in the push request.

In the previous embodiments the step of transmitting the second nonce (which may be the decryption key for decrypting the first nonce, or which may be a separate nonce) from the first server (Server A) to the second server (Server B) may comprise forwarding at least a portion of the handshake request (sent by the client application towards Server A) to the second server with a push request that is configured to cause the second server to forward the second nonce or the decryption key to the application in a message through the secure and authenticated communication channel via the push functionality. In this manner the client application is enabled to perform the logical or mathematical operation on the received second nonce (which may be the decryption key) and the first nonce to obtain the candidate result, which the client application may then forward to Server A in order to authenticate itself towards Server A.

Upon receipt of the candidate result, Server A will then inspect the candidate result, compare it to the result that Server A generated, and determine whether the results match (step 210). If the results match, Server A may return a token to the client electronic device (step 211). The client application may then use this token as proof that it has been correctly authenticated towards Server A, and a secure and authenticated communication channel will then exist (if not previously established) between the client device and Server A.

Optionally, Server A may generate the token and associate an expiration time with the token. The expiration time may include an actual time, or a measure of time from a time of generation, transmission and/or receipt of the token. An expiration time may help provide additional security in the process. The expiration time may be included in the token, or Server A may store the expiration time in a data set in association with an identifier for the token so that Server A can look up the token's expiration time when Server A is presented with the token.

The client application may then store the token in the client electronic device's memory so that the application can use the token to initiate service requests, which the client electronic device will direct to Server A (step 212) via the secure and authenticated communication channel between the client and Server A. Upon receipt of a service request from the application via the secure and authenticated communication channel, Server A will inspect the request and determine whether the token is valid (step 213). Determining whether the token is valid may include requiring, as a condition of determining that the token is valid, that the token is associated with an expiration time that has not yet passed. If the token is valid, Server A may thereafter provide the client application with the service (step 214).

Once the client application has received the token, the client application may submit additional service requests with the token to Server A (repeating step 212) via the secure and authenticated communication channel Server A will again inspect each such the request and determine whether the presented token is valid (step 213). For such subsequent requests, determining whether the token is valid may include requiring, as a condition of determining that the token is valid, that the token is associated with an expiration time that has not yet passed. If the token is valid, Server A may thereafter provide the client application with the service (step 214).

In some embodiments, in response to the client application's initial handshake request (step 202), Server A may grant the client application with provisional access to the service before the client electronic device presents the candidate result and token (step 231). Provisional access may be time-limited, it may restrict access to certain categories of data, and/or it may provide access to only some, but not all, of the available features of the service. Provisional access can help to account for the time lag associated with delivery of the push notification to the client device by Server B, as the time between when a push notification is requested by Server A and when it is received by the client can vary from a few seconds to a several minutes or longer. In some embodiments, network delays or other factors may prevent the client from receiving the push notification at all. If so, the client application may initiate an additional handshake request if it does not receive the push notification within a specified time period, or Server A may send an additional push request if it does not receive the candidate result within a specified time period. Optionally, the number of retries may be limited to a threshold number within a specified period of time.

In some embodiments, the client application may share the token with other known applications on the same device, all of which may be affiliated with the service provider of Server A. For example, if the client application is a mail service, once the mail service application completes the authorization handshake process as described above it may store the token in a keychain that is shared with other file sharing, streaming media service and/or other applications on the device that are also associated with Server A. Server A (which may be a single server or a collection of servers that are all affiliated with a common service provider or affiliated set of service providers) will maintain a record of various applications that each may be authenticated by receipt of the token. In FIG. 2, the client application that receives the token from Server A is denoted as Client A, while an example of a federated application is denoted as Client A'. When Client A shares the token with Client A' (step 221) such as by storing the token in a keychain that is shared by both applications, Client A' will submit a service request that includes the token, as well as the application identifier for Client A' (step 222). When Server A receives the service request from Client A', Server A will inspect the service request to determine whether the token is valid (step 223) using procedures such as those discussed for the previous validation step. If the token is valid, Server A will provide Client A' with the requested service (step 224).

In the process above, a device token may change at various points in time, such as after a restore from backup, upon installation of a new device, or after reinstalling the operating system. After an event such as these happens, the application may initiate a new handshake process at any time. The application may initiate this process by retrieving a previously-stored device token or by requesting a device token as it did at the start of the process described above.

Figure 3:
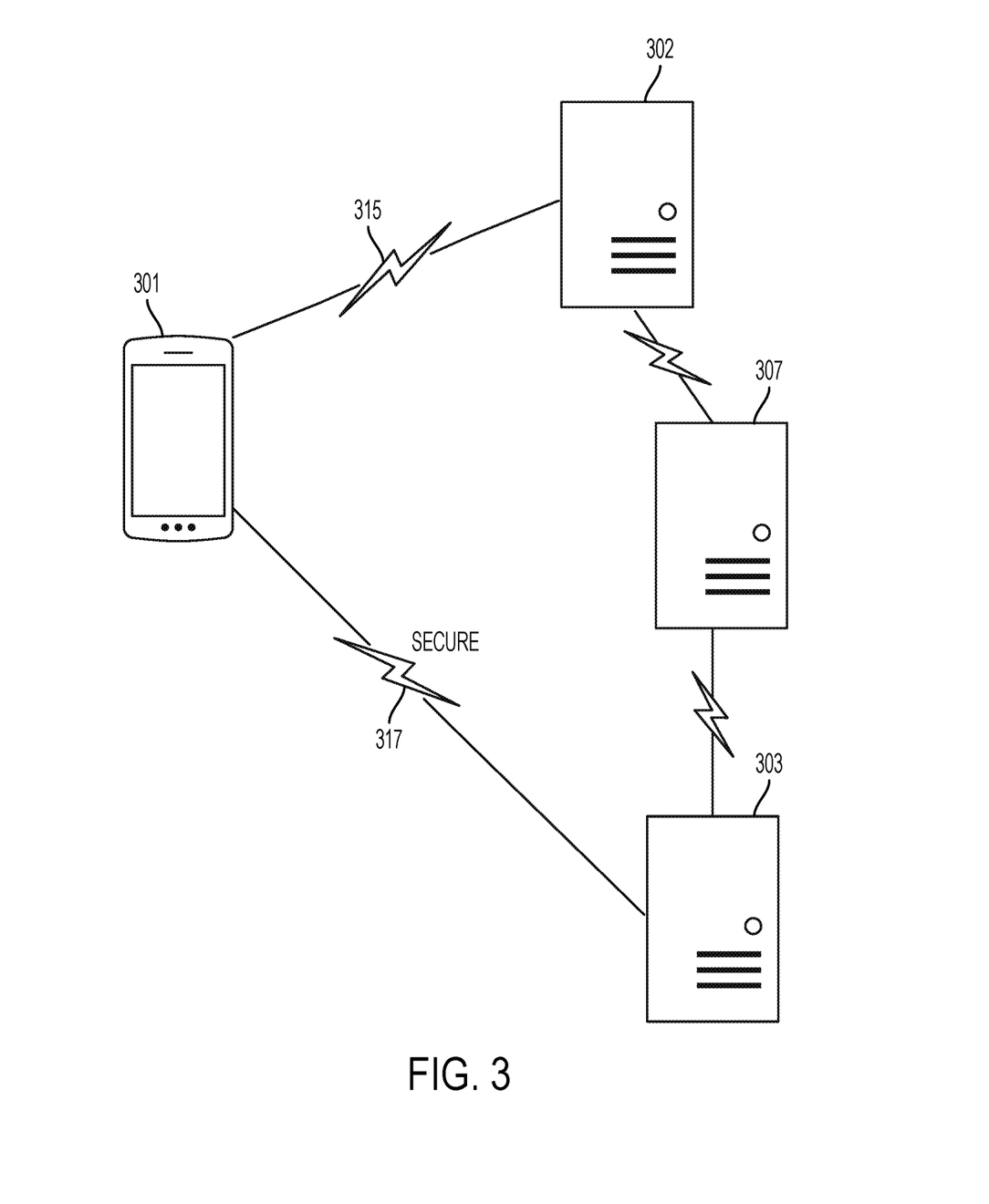
FIG. 3 illustrates a variation of the system of FIG. 1.

FIG. 3 illustrates an alternate embodiment in which, rather than (or in addition to) directly communicating with Server B, Server A 302 communicates with Server B 303 via an intermediate server 307, which may be referred to below as "Server C".

Electronic device 301 is the client electronic device on which one or more client applications are installed. A first server, Server A 302, is an application server in communication with the client device via communication channel 315. The communication channel 315 may be a secure channel or an unsecured channel Client electronic device 301 is also in communication with a second server 303 ("Server B"), which may be an authentication server or a server that is associated with an operating system or other application running on the electronic device 301. The client electronic device 301 will again be known to the second server 303 so that when certain information is presented to the second server 303 (and in particular a unique device identifier in a form such as a code or token), the second server 303 may provide the client electronic device 301 with a service and/or authentication credentials for a service via a secure and authenticated communication channel 317.

The first server 302 and second server 303 also may communicate with each other via a secured or unsecured communication channel. This may occur directly, and/or indirectly via a third server 307 (referred to below as "Server C"). This embodiment may enable multiple service providers to share an authentication token with the client electronic device.

Figure 4:
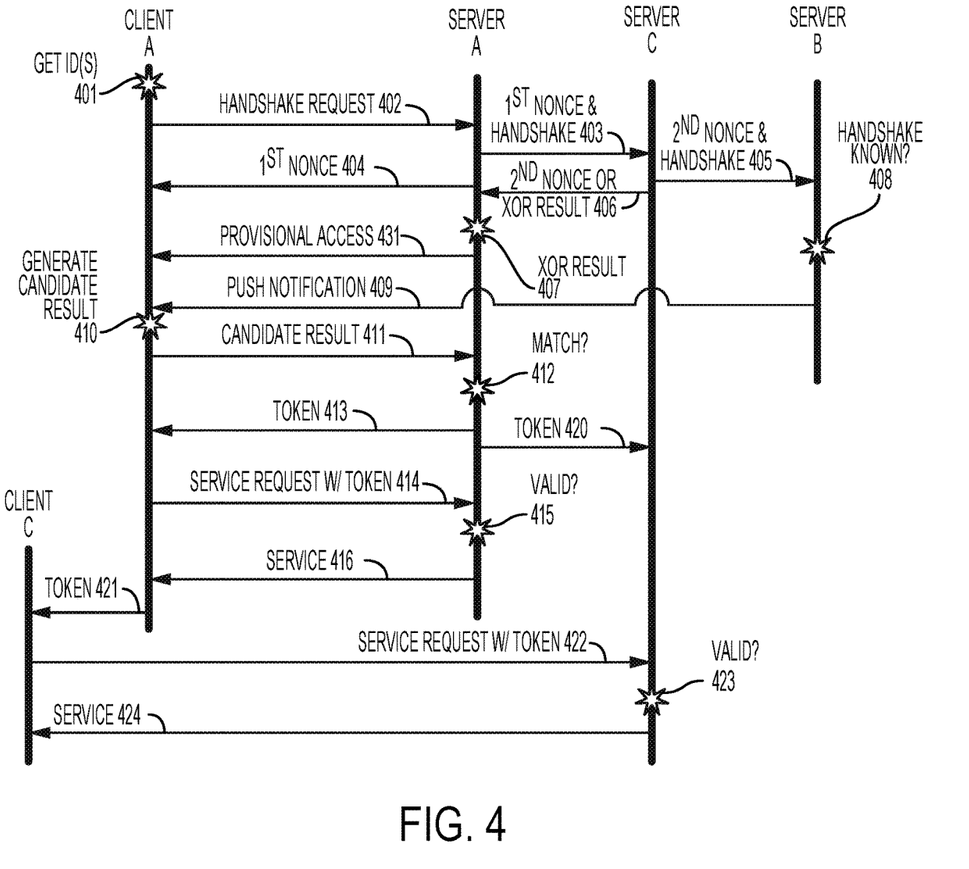
FIG. 4 illustrates a variation of the process of FIG. 2.

FIG. 4 illustrates how the embodiment of FIG. 3 may operate in practice. Like the embodiment of FIG. 2, in FIG. 4 a client application installed on the electronic device will obtain the electronic device's device identifier (step 401). The client application also will have an associated application identifier. The client application will generate a handshake request, and it will send the handshake request Server A via a communication channel that may or may not be secure (step 402). The payload of the handshake request will include the application identifier for the client application and the device identifier for the client electronic device. Also as with the embodiment of FIG. 2, the device identifier or other data in the handshake request may be used by Server B to indicate that the client electronic device is known by and authorized to receive certain push notifications.

Also as with the embodiment of FIG. 2, in FIG. 4, Server A will receive the handshake request and again generate a first nonce using any suitable random code generation process. Server A will send the first nonce to the client electronic device (step 404) via a communication channel that may or may not be secure. In some embodiments, Server A may encrypt the first nonce and generate a symmetric encryption key that the client electronic device may use to decrypt the first nonce. If so, the when transmitting the first nonce to the client electronic device (step 404) Server A will send the first nonce to the client electronic device in encrypted form. However, Server A will not send the encryption key to the client electronic device.

At this point, the process of FIG. 4 differs from that of FIG. 2 in that Server A sends the first nonce, handshake request and (if generated) encryption key to Server C (step 403). Server C is operated by a service provider to serve applications on the client device that are not served by Server A, and vice versa. Server A also may send the first nonce, the handshake request and/or the key as a push request to Server B. Alternatively or in addition, Server C may forward the first nonce, handshake request and/or key to Server B after receipt from Server A (step 405).

Unlike the embodiment of FIG. 2, in FIG. 4 Server A will not generate the second nonce that is used in the XOR (or other) operation. Instead, Server B will generate the second nonce. In step 406, there are two options. In one option, Server B may perform the logical or mathematical operation on the first and second nonces, and Server B may then send the result of the operation to Server A. Alternatively, Server B may send the second nonce to Server A, and Server A may perform the operation on the first and second nonces. Either way, Server A will have the operational result for use when determining whether to issue tokens in the future. If Server C performs the operation, it too may store the result and use the result to determine whether to issue tokens in the future. As with FIG. 2, the operation of FIG. 4 may be an XOR operation or another type of logical or mathematical operations.

The remainder of the process works like the process of FIG. 2. In FIG. 4, when Server B receives the push request (either directly from Server A or as passed through by Server C), Server B will inspect the push request to determine whether the client electronic device is a known device (step 408). If Server B identifies the client device as a known device, in step 409 Server B will generate a push notification that includes the second nonce and (if available) the key for decrypting the first nonce, and Server B will send the push notification to the client electronic device via a secure and authenticated communication channel. The push notification again may be a silent push notification in some embodiments. As with the process of FIG. 2, in FIG. 4 "Server B" may be a single server or multiple servers and/or data stores that are in communication with each other.

After the client electronic device receives the push notification, the client application will then have both the first nonce and the second nonce. If the client electronic device received the first nonce in encrypted form, and if it received the key with the push notification, the client application may use the key to decrypt the first nonce. Thus, the client application can then perform the same operation on the first and second nonces as Server A or Server B performed, such as an XOR operation (step 410). The result of the operation may be considered to be a candidate result. The client application will cause the client electronic device to send the candidate result to Server A (step 411) to request a token, along with some identifying information such as the application identifier and/or the device identifier.

Upon receipt of the candidate result, Server A will then inspect the candidate result, compare it to the result that Server A generated, and determine whether the results match (step 412). If the results match, Server A will return a token to the client electronic device (step 413). Optionally, Server A may generate the token and associate an expiration time with the token as described in previous embodiments. The expiration time may include an actual time, or a measure of time from a time of generation, transmission and/or receipt of the token. Optionally, Server A may share the token with Server C as well (step 420).

The client application may then use the token to initiate a service request, which the client electronic device will direct to Server A (step 414). Server A will inspect the request and determine whether the token is valid (step 415). Determining whether the token is valid may include requiring, as a condition of determining that the token is valid, that the token is associated with an expiration time that has not yet passed. If the token is valid, Server A may thereafter provide the client application with the service (step 416) and a secure and authenticated communication channel will then exist between the client and Server A if not previously established.

Once the client application has received the token, the client application may submit additional service requests with the token to Server A (repeating step 412). Server A will again inspect each such the request and determine whether the presented token is valid (step 413). For such subsequent requests, determining whether the token is valid may include requiring, as a condition of determining that the token is valid, that the token is associated with an expiration time that has not yet passed. If the token is valid, Server A may thereafter provide the client application with the service (step 414).

In some embodiments, in response to the client application's initial handshake request (step 402), Server A may grant the client application with provisional access to the service before the client electronic device presents the candidate result and token (step 431). Provisional access may be time-limited, it may restrict access to certain categories of data, and/or it may provide access to only some, but not all, of the available features of the service.

To enable applications associated with Server C to obtain the service, the client application (Client A) may share the token with one or more trusted applications on the same device that are affiliated with the service provider of Server C (step 421). In FIG. 4, the client application that receives the token from Server A is denoted as Client A, while any application that receives a token from Client A but is affiliated with Server C is denoted as Client C. When Client A shares the token with Client C (step 421). Client C will submit a service request that includes the token and an application identifier for Client C (step 422). When Server A receives the service request from Client A', Server A will inspect the service request to determine whether the token is valid (step 223) using procedures such as those discussed for the previous validation step. If the token is valid, Server A will provide Client A' with the requested service (step 224).

In addition to the processes described above, other security measures can help permit an electronic device's operating system to authenticate am application. One is application data security. Some operating systems provide internal storage that is only accessible to the application (outside of a root compromise, or what is sometimes referred to as "jailbreaking"). For this reason, for most use cases, data that arrives (over a secure channel) at the device for an application and is subsequently stored can be considered to be secure even if the application binary itself is publicly available. A pretender thus would need to substitute its own application for the developer's application and access the data, if there was not some way to prevent it.

A second possible security measure is that applications may be signed by a developer key. This ensures that only the application or an authorized updated version of the application can continue to access data on the device through the first security measure above. The operating system verifies the signature before allowing the application to access the stored data. A pretender cannot fake the signature without access to the developer key, and the pretender thus cannot substitute its own application to access the data.

A third possible security measure is a related to the second one. Applications can retrieve a device token and send it to the server to allow the server to establish a one-way communication channel to the application on the device. More specifically, it is assumed that a message sent to a messaging service with a token identifying a specific application on a specific device can only be received by the application (the application being signed by a specific developer key) running on that device. A pretender should therefore not be able receive these notifications.

Figure 5:
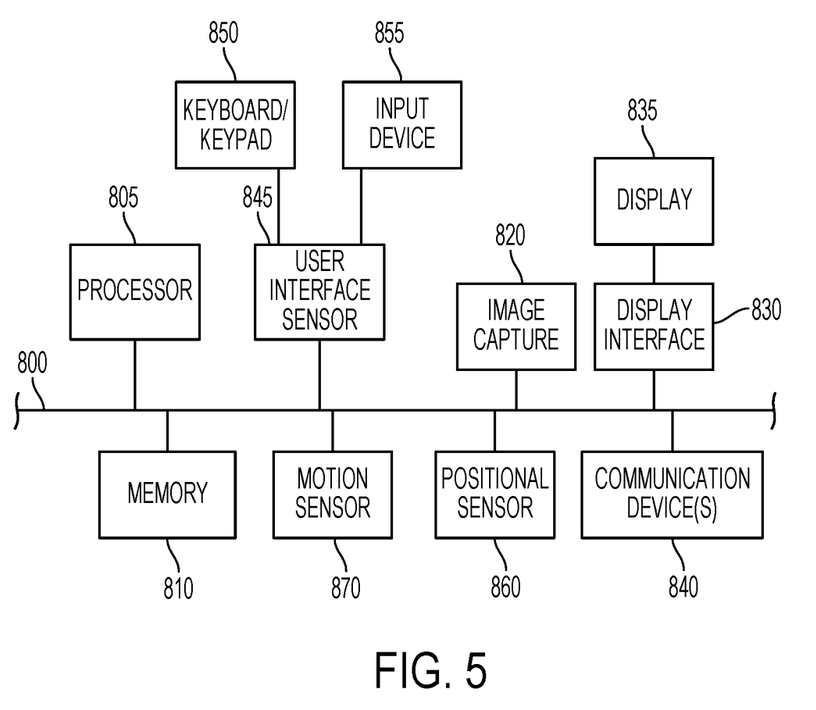
FIG. 5 illustrates example components that may be included in an electronic device or a system of electronic devices, such as in a client device and/or server device.

FIG. 5 depicts an example of hardware that may be included in any of the electronic devices of the system, such as the client electronic device or any of the servers. An electrical bus 800 serves as an information highway interconnecting the other illustrated components of the hardware. Processor 805 is a central processing device configured to perform calculations and logic operations required to execute programming instructions. As used in this document and in the claims, the terms "processor" and "processing device" may refer to a single processor or any number of processors in a set of processors, whether a central processing unit (CPU) or a graphics processing unit (GPU) or a combination of the two. Read only memory (ROM), random access memory (RAM), flash memory, hard drives and other devices capable of storing electronic data constitute examples of memory devices 825. A memory device may include a single device or a collection of devices across which data and/or instructions are stored.

An optional display interface 830 may permit information from the bus 840 to be displayed on a display device 835 in visual, graphic or alphanumeric format. An audio interface and audio output (such as a speaker) also may be provided. Communication with external devices may occur using various communication devices 840 such as a wireless antenna, an RFID tag and/or short-range or near-field communication transceiver, each of which may optionally communicatively connect with other components of the device via one or more communication ports. A communication device 840 may be attached to a communications network, such as the Internet, a local area network or a cellular telephone data network.

The hardware may also include a user interface sensor 845 that allows for receipt of data from input devices 850 such as a keyboard, a mouse, a joystick, a touchscreen, a touch pad, a remote control, a pointing device and/or microphone. The system also may include a positional sensor 860 and/or motion sensor 870 to detect position and movement of the device. Examples of motion sensors 870 include gyroscopes or accelerometers. Examples of positional sensors 860 include a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of authenticating a service request, the method comprising, by a first server:
   receiving a handshake request from a client application on a client electronic device via a communication network, wherein the handshake request comprises an application identifier for the client application and a device identifier for the client electronic device, and the handshake request also identifies the client application as having been authenticated to a second server and as being entitled to receive a notification from the second server using a secure and authenticated communication channel;
   generating a first nonce, and transmitting the first nonce to the client electronic device; storing, in a memory, a result of a logical or mathematical operation performed on the first nonce and on a second nonce;
   transmitting the application identifier and the device identifier to the second server with a request to forward the notification to the client application via the secure and authenticated communication channel;
   receiving, from the client application, a message that includes a candidate result;
   determining whether the candidate result matches the stored result;
   in response to determining that the candidate result matches the stored result, transmitting a token to the client electronic device;
   receiving a service request from the client application, wherein the service request includes the token;
   inspecting the service request to determine whether the service request includes the token and that the token is valid; and
   upon determining that the service request includes the token and that the token is valid, providing the client application with a service that is responsive to the service request.

2. The method of claim 1, wherein inspecting the service request to determine whether the token is valid comprises requiring, as a condition of determining that the token is valid, that the token is associated with an expiration time that has not yet passed.

3. The method of claim 1, further comprising, by the first server before receiving the message from the client application:
   generating a second nonce;
   performing the logical or mathematical operation on the first nonce and the second nonce; and
   transmitting the second nonce to the second server with the request.

4. The method of claim 1, further comprising, by the first server:
   before sending the first nonce to the client electronic device, encrypting the first nonce so that the first nonce, when sent to the client electronic device, is sent in encrypted form; and
   transmitting a key for the encrypted first nonce to the second server.

5. The method of claim 1, further comprising, by the first server:
   before sending the first nonce to the client electronic device, encrypting the first nonce so that the first nonce, when sent to the client electronic device, is sent in encrypted form;
   transmitting a key for the encrypted first nonce, the application identifier and the device identifier to a second server, either directly or indirectly via a third server; and
   transmitting the first nonce to the third server.

6. The method of claim 5 further comprising, by the first server before storing the result of the logical or mathematical operation:
   receiving the second nonce from the third server; and
   performing the logical or mathematical operation on the first and second nonces to yield the result of the operation.

7. The method of claim 5 further comprising, by the first server before storing the result of the logical or mathematical operation receiving the result of the logical or mathematical operation from the third server.

8. The method of claim 1, further comprising, by the first server:
   receiving an additional service request from the client application, wherein the additional service request includes the token;
   inspecting the additional service request; and
   upon determining that the additional service request includes the token and that the token is valid, providing the client electronic device with an additional service that is responsive to the additional service request.

9. The method of claim 1, further comprising, by the first server:
- maintaining a record of a plurality of applications, each of which may be authenticated by receipt of the token;
- receiving an additional service request for a different application from the client electronic device, wherein the additional service request includes the token, a different application identifier, and the device identifier;
- inspecting the additional service request; and
- upon determining that (a) the additional service request includes the token, (b) the additional service request is for an application that is in the record and (c) the token is valid, providing the different application of the client electronic device with an additional service that is responsive to the additional service request.

10. The method of claim 9, wherein determining that the token is valid comprises confirming that the device identifier received with the additional service request is the same device identifier that was received with the handshake request.

11. The method of claim 1, wherein the candidate result and the stored result are each an output of an exclusive OR (XOR) operation.

12. The method of claim 1, wherein the application identifier and the device identifier are in a form of a token that represents an application:device tuple.

13. The method of claim 1 further comprising, by the first server before receiving the candidate result, providing the client application with provisional access to the service.

14. A method of requesting a service, the method comprising, by a client application on a client electronic device, causing the client electronic device to:
- generate a handshake request for a first server, wherein the handshake request comprises an application identifier for a first application running on the client electronic device and a device identifier for the client electronic device, and the handshake request identifies the first application as having been authenticated to a second server and as being entitled to receive a notification from the second server using a first secure and authenticated communication channel;
- transmit the handshake request with the application identifier and the device identifier to a first server;
- receive a first nonce from the first server;
- receive, from the second server via the first secure and authenticated communication channel, a push notification that includes a second nonce;
- perform a mathematical or logical operation on the first nonce and the second nonce to yield a candidate result;
- transmit the candidate result to the first server; and
- receive a response from the first server, wherein the response includes a token.

15. The method of claim 14 further comprising, by the client application, causing the client electronic device to:
- transmit a service request for a service to the first server and present the first server with the token in connection with the service request; and
- receive the service from the first server in response to the service request via a second secure and authenticated communication channel.

16. The method of claim 14, wherein:
- the first nonce is an encrypted nonce;
- the push notification includes a key; and
- the method further comprises, by the client application before causing the client electronic device to perform the logical operation, causing the client electronic device to use the key to decrypt the first nonce.

17. The method of claim 15 further comprising, by the client application:
- sharing the token with a second application running on the client electronic device;
- causing the client electronic device to transmit a service request with the token and an application identifier for the second application to the first server via the second secure and authenticated communication channel; and
- receiving the service from the first server in response to the service request.

18. The method of claim 14, wherein the push notification is a silent push notification.

19. A system for authenticating a service request comprising a first server comprising a processor and a memory device containing programming instructions that are configured to cause the processor to:
- receive a handshake request from a client application on a client electronic device, wherein the handshake request comprises an application identifier for the client application and a device identifier for the client electronic device, and the handshake request also identifies the client application as having been authenticated to a second server and as being entitled to receive a notification from the second server using a secure and authenticated communication channel
- generate a first nonce and transmit the first nonce to the client electronic device,
- store, in a memory, a result of a logical or mathematical operation performed on the first nonce and on a second nonce,
- transmit the application identifier and the device identifier to a second server with a request to forward a message to the client application via a secure and authenticated communication channel,
- receive, from the client application, a message that includes a candidate result, determine whether the candidate result matches the stored result,
- in response to determining that the candidate result matches the stored result, transmit a token to the client electronic device,
- receive a service request from the client application, wherein the service request includes the token, and
- inspect the service request to determine whether the service request includes the token and that the token is valid, and upon determining that the service request includes the token and that the token is valid, provide the client application with a service that is responsive to the service request.

20. The system of claim 19, further comprising:
- the second server, the second server configured to:
  - provide a push functionality capable of forwarding, via the secure and authenticated communication channel between the client application and the second server;
  - receive, in response to a push request, a message to the client application through the secure and authenticated communication channel;
- wherein the handshake request also identifies the client application as having been authenticated to the second server and as being entitled to receive a message through a push notification using the secure and authenticated communication channel; and
- wherein the programming instructions to transmit the second nonce to the second server comprise instructions to forward at least a portion of the handshake request to the second server with a push request that is configured to cause the second server to forward the second nonce to the application in a message through the secure and authenticated communication channel via the push functionality.

\* \* \* \* \*